US006142035A

United States Patent [19]

Babatz et al.

[11] Patent Number: 6,142,035

[45] Date of Patent: Nov. 7, 2000

[54] INTERIOR SECURING DEVICE FOR A LOCK OF A MOVABLE BODY PART OF A MOTOR VEHICLE AND METHOD OF OPERATION

[75] Inventors: Udo Babatz, Sindelfingen; Herbert Schmidt, Herrenberg; Claus Töpfer, Sindelfingen, all of Germany

[73] Assignee: DaimlerChrysler AG, Stuttgart, Germany

[21] Appl. No.: 09/031,740

[22] Filed: Feb. 27, 1998

[30] Foreign Application Priority Data

Feb. 27, 1997 [DE] Germany ........................... 197 07 812

[51] Int. Cl.[7] .............................. F16C 1/10; E05C 19/10; E05C 1/12

[52] U.S. Cl. .................. 74/501.6; 74/500.5; 74/501.5 R; 74/527; 292/125; 292/171; 292/36.3; 292/50; 292/129; 292/201

[58] Field of Search ................................ 74/500.5–502.6, 74/527; 292/225, 347, 171, 226, 336.3, 50, 129, 128; 70/239; D8/300–302, 331

[56] References Cited

U.S. PATENT DOCUMENTS

| | | | |
|---|---|---|---|
| 1,669,356 | 5/1928 | Stevenson | 74/500.5 |
| 2,312,537 | 3/1943 | Fergueson et al. | 292/225 |
| 2,749,165 | 6/1956 | Coulter | 292/171 |
| 2,809,064 | 10/1957 | Dlugatch | 292/226 |
| 2,917,770 | 12/1959 | Etnyre | 16/82 |
| 3,046,043 | 7/1962 | Matteson | D8/331 X |
| 3,858,922 | 1/1975 | Yamanaka | 292/336.3 |
| 4,054,307 | 10/1977 | Carella e al. | 292/50 |
| 4,266,816 | 5/1981 | Mukai et al. | 292/129 |
| 4,458,930 | 7/1984 | Goike et al. | 292/201 |
| 4,474,393 | 10/1984 | Kimura | 292/171 |
| 4,525,004 | 6/1985 | Tanaka | 292/171 |
| 4,917,418 | 4/1990 | Gokee | 292/125 |
| 5,054,826 | 10/1991 | Dow et al. | 292/125 |
| 5,358,292 | 10/1994 | Van Wiebe et al. | 292/235 |

FOREIGN PATENT DOCUMENTS

| | | | |
|---|---|---|---|
| 0169644 | 1/1986 | European Pat. Off. . | |
| 0 375 275 A2 | 6/1990 | European Pat. Off. . | |
| 2531477 | 2/1984 | France . | |
| 2908613 | 9/1980 | Germany . | |
| 3202433 A1 | 8/1983 | Germany | 74/501.5 R |
| 3513610 | 11/1986 | Germany . | |
| 2291109 | 1/1996 | United Kingdom . | |

OTHER PUBLICATIONS

English Language Abstract of DE 2908613.

*Primary Examiner*—Vinh T. Luong
*Attorney, Agent, or Firm*—Evenson, McKeown, Edwards & Lenahan, P.L.L.C.

[57] ABSTRACT

An interior securing device for a lock of a movable vehicle body part of a motor vehicle includes a Bowden cable provided as a transmitting device which is rigidly connected with a securing knob and is linked to an adjusting element. The Bowden cable is surrounded along its length by a flexible guiding sleeve. Near the securing knob, the guiding sleeve is held fixed to the vehicle body part. Near the adjusting element, the guiding sleeve is held fixed to the lock. The securing device is particularly suitable for use with rear side doors of passenger cars.

14 Claims, 1 Drawing Sheet

INTERIOR SECURING DEVICE FOR A LOCK OF A MOVABLE BODY PART OF A MOTOR VEHICLE AND METHOD OF OPERATION

This application claims the priority of German Appln. No. 19707812.5-22, filed on Feb. 27, 1997.

BACKGROUND AND SUMMARY OF THE INVENTION

This invention relates to an interior securing device for a lock of a movable body part such as a side door of a motor vehicle. The device has a securing knob arranged on a vehicle-interior side and guided in a linearly movable manner between a release position and a securing position. The securing knob is connected by transmitting devices with an adjusting element of the lock which can be moved between a releasing position and a locking position.

Such interior securing devices are commonly used in Mercedes-Benz passenger cars. The side doors of a four-door passenger car are provided, on their sides facing the vehicle interior, with vertically aligned, linearly movable securing knobs. The securing knobs are connected by transmitting devices, in the form of transmission linkages, with corresponding adjusting elements of the door locks. For front side doors, only short transmission paths must be bridged between the securing knobs and the door locks by transmission linkages since the securing knobs are mounted in direct proximities of the front door locks. For rear side doors, by contrast, the securing knobs are arranged at large distances from the door locks because the door locks, in rearward portions of the rear side doors, are arranged at levels of the vehicle body "C-columns" and the securing knobs in the forward area of the rear side doors are arranged at levels of the vehicle body "B-columns". The transmission linkage between a securing knob and a door lock of a rear side door has a vertical transmission rod and a horizontal transmission rod which are coupled with one another by a reversing lever. Depending on the type, the horizontal transmission rod can be divided into two parts for mounting reasons. The two rod parts are connected with one another by a guiding clamp. High mounting and adjusting expenditures, therefore, are typically required for construction and assembly of transmission linkages for rear side doors.

It is an object of the invention to provide an interior securing device of the initially mentioned type which requires reduced mounting and adjusting expenditures.

This object is achieved by providing a particularly connected Bowden cable as the transmitting device. The Bowden cable is rigidly connected with the securing knob and is linked to the adjusting element. The cable is surrounded along its length by a flexible guide sleeve. In the area of the securing knob, the guide sleeve is fixed to the vehicle body part. In the area of the adjusting element, the guide sleeve is fixed to the lock. The Bowden cable transmits both tension loads and pressure loads. By providing a Bowden cable, the number of individual components of the interior securing device is considerably reduced in comparison to known devices. As a result, mounting of the interior securing device is simplified. The rigid arrangement of the securing knob on the Bowden cable and the direct transmission of the continuous Bowden cable eliminate the previously required adjusting expenditures. The interior securing device, therefore, can be produced at much more reasonable cost. The flexible Bowden cable results in an interior securing device which is also at least largely insensitive to impact loads on the motor vehicle because the Bowden cable can yield. The reduced number of components for the interior securing device also clearly reduces its weight.

As German Patent Document DE 29 08 613 A1 shows, it is known to provide Bowden cables as transmitting elements between door handles and door locks of vehicle side doors. Each of these Bowden cables, however, is used exclusively for unlocking a door lock. An adjusting operation of the door lock is performed exclusively by a tension load on the Bowden cable. There is no connection between adjusting elements of the door lock locking mechanism and a securing knob.

According to one feature of the invention, the securing knob is molded in one piece to a front end of the Bowden cable. The Bowden cable is preferably made of wire. The securing knob consists of a plastic material and is injection-molded to the Bowden cable.

According to another feature of the invention, the securing knob is disposed in a guide housing which is fastened in a vehicle-body-fixed interior panel part. A stop for an end position of the Bowden cable is provided on the guide housing. A second stop for the opposite end position of the Bowden cable is provided on the lock in the area of the adjusting element. The stop for one end position of the Bowden cable is arranged in the area of the securing knob. The other stop, for the opposite end position of the Bowden cable, is provided in the area of the adjusting element. Consequently, adjusting operations for adjusting the interior securing device are no longer required. It is assumed that the lift of the securing knob inside the guide housing, the adjusting path of the adjusting element on the lock, and the displacement path of the Bowden cable are correspondingly adapted to one another with respect to relevant measurements. Naturally, the mechanism of the lock actuated by the adjusting element must be designed to have tolerances such that the maximal path of the Bowden cable causes locking or unlocking of the lock in every case.

According to a further feature of the invention, a compensating play within acceptable tolerances is provided to the adjusting element for the end position corresponding to the stop in the guide housing. This ensures that the end position of the Bowden cable is defined exclusively by the stop in the guide housing. The lock mechanism is adapted to the compensation play such that a corresponding actuation of the lock takes place in every case.

According to yet a further feature of the invention, the flexible guide sleeve can be fastened on the guide housing by a detent connection. In this case, a simple mounting is achieved without additional tools. Advantageously, the detent elements assigned to the sleeve are molded in one piece to the sleeve. This embodiment is particularly advantageous when the sleeve is constructed as a plastic component.

Finally, yet another feature of the invention has the guide housing provided with a bush-shaped design. The guide housing can be fastened in an opening of the interior panel part by a detent connection. This permits a simple and operationally reliable mounting of the guide housing.

BRIEF DESCRIPTION OF THE DRAWINGS

Additional advantages and characteristics of the invention will become clear from the following description of a preferred embodiment of the invention and from the drawings.

DESCRIPTION OF THE PREFERRED EMBODIMENT

Figure 1:
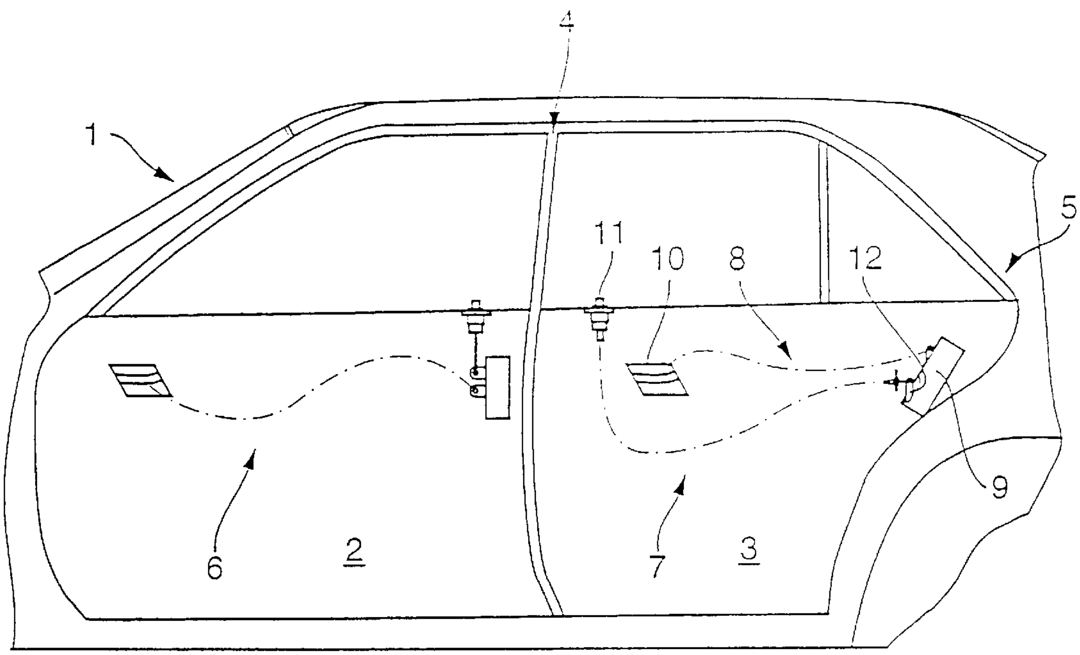
FIG. 1 is a schematic lateral view of a four-door passenger car including a rear side door which is provided with an interior securing device according to the invention.

FIG. 1 shows a portion of a passenger car having a passenger compartment 1 which is provided with side doors 2, 3. The passenger compartment 1 has two front side doors 2 and two rear side doors 3. At a transition between each front side door 2 and one of the rear side doors 3, the passenger compartment 1 has a "B-column" 4. Toward the rear of the vehicle, which is not shown, one "C-column" 5 is provided to the rear of each rear side door 3.

Each front side door 2 and each rear side door 3 is provided with a door lock which fixes the respective side door 2, 3 on the B-column or on the C-column 5. In a manner known per se, the side doors 2, 3 are disposed so as to swivel, when viewed in the longitudinal direction of the vehicle, about their forward front edges by corresponding hinge arrangements.

Each front side door 2 has an actuating mechanism 6 for unlocking the door lock from the vehicle interior. This actuating mechanism 6 is designed to have a function corresponding to that of the actuating mechanism known from German Patent Document DE 29 08 613 A1. A gripping element disposed on the interior side of the front side door 2 carries out a corresponding unlocking of the door lock with a Bowden cable or an actuating linkage. Directly above the door lock, a securing knob is guided in a vertically linearly movable manner in an interior panel part of the front side door 2. The securing knob is connected by a short transmission rod to a corresponding adjusting element for securing or releasing the door lock.

The rear side door 3 is also provided with an actuating mechanism 8 for unlocking the door lock 9 from the rearward area. The actuating mechanism 8 essentially corresponds to the actuating mechanism 6 for the front side door 2. The actuating mechanism 8 has a gripping element 10 which is disposed on the interior side of the rear side door 3 facing the rearward area and which, by way of a Bowden cable illustrated by a dash-dotted line, actuates a corresponding adjusting element of the door lock 9. The actuating mechanism 6 as well as the actuating mechanism 8 are used exclusively for opening the door lock and thus for opening the respective side door.

The rear side door 3 is also provided with an interior securing device 7 which has a securing knob 11 arranged at a distance from the door lock 9 in the area of the forward front side of the rear side door 3 and thus in the area of the B-column 4 on the vehicle interior side on the rear side door 3. The securing knob 11 is connected, in a manner to be described in detail, by transmitting devices with an adjusting lever 12 of a lock mechanism of the door lock 9. The adjusting lever 12 secures or releases the door lock 9. In this case, a releasing operation is an uncoupling or a release of the lock mechanism which does not directly cause an opening of the door lock 9. This is in contrast to what occurs by moving the adjusting element of the door lock by way of the actuating mechanism 8.

A Bowden cable is provided as the transmitting device between the securing knob 11 and the adjusting lever 12. The Bowden cable 17 is designed as a wire cable or rope cable. The Bowden cable 17 transmits tension and pressure forces to the same extent. The securing knob 11 is a one-piece continuation of the Bowden cable 17. The securing knob 11 is injection-molded in a simple manner in one piece to the corresponding front end **17*f* of the Bowden cable 17. A connection piece 18 is placed on the opposite front end 17*o* of the Bowden cable 17 and is linked to the adjusting lever 12 at a hinge point 34. The connection piece 18 may also be fixedly connected with the front end of the Bowden cable 17 in a different manner 34. The Bowden cable 17 is guided in a Bowden cable sleeve 19 which is also made of a flexible plastic material. On its front end facing the securing knob 11, the Bowden cable sleeve 19 has a connection stub 20. The sleeve 19 has a connection stub 21** on its opposite front end.

The securing knob 11 is disposed in a bush-type guide housing 13 in a vertically linearly movable manner. This housing 13 is manufactured as a plastic injection-molded part. The guide housing 13 is inserted into a breakthrough in the area of a top side of an interior wall panel part 14. The interior panel part 14 is designed in a dimensionally stable manner and is fixedly connected with the interior side of the rear side door 3. For locking the guide housing 13 in the breakthrough of the interior panel part 14, the exterior shell of the bush-type guide housing 13 has several detent tongues 15 which are distributed along the circumference and which interact with an upper stop collar 16 molded to the guide housing 13. The guide housing 13 is pushed from above into the breakthrough of the interior panel part 14 until the stop collar 16 comes to rest on the surface of the interior panel part 14. Simultaneously, the detent tongues 15 reach behind the underside of the interior panel part 14 so that a form-fitting locking of the guide housing 13 is achieved in the interior panel part 14. The bush-type guide housing 13 has a bottom 24 which is horizontal in the mounted condition and which acts as a lower stop for the securing knob 11.

Figure 2:
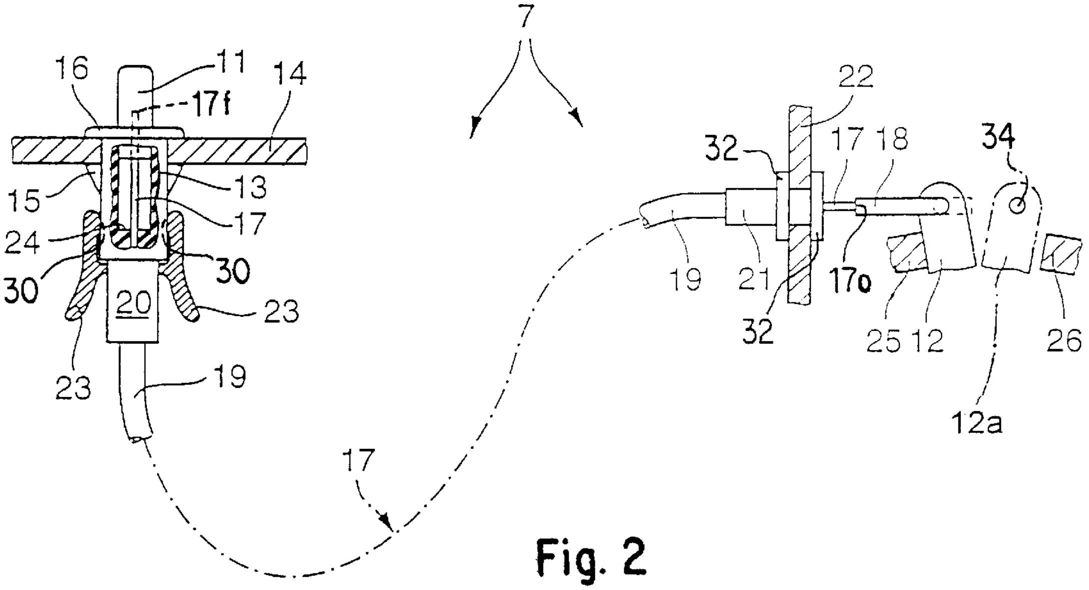
FIG. 2 is an enlarged sectional view of the interior securing device for the rear side door according to FIG. 1.

The Bowden cable sleeve 19 is fixed on the guide housing 13 by detent hooks 23 which engage in corresponding detent recesses 30 on the outer shell of the guide housing 13. The detent hooks 23 and the detent recesses 30 therefore form a detent connection structure for fixing an end of the sleeve to the guide housing. The detent hooks 23 are one-piece parts of the connection piece 20. For fixing the Bowden cable sleeve 19 by the opposite connection piece 21, a holding flange 22 is provided which is fixedly connected with the housing of the door lock 9 and in which the connection piece 21 is form-lockingly fixed by two ring collars 32. Since the securing knob 11 is a one-piece continuation of the Bowden cable 17, one end position of the Bowden cable 17 is defined by the bottom 24 of the guide housing 13 used as a first stop for the securing knob 11. The opposite end position of the Bowden cable 17 is defined by a lock-side or second stop 25 against which the adjusting lever 12 strikes. The other end position of the adjusting lever 12, in which the securing knob 11 strikes against the bottom 24 of the guide housing 13, is defined by a position **12*a*. Thus, the securing know can be moved between a securing position, shown by phantom lines, and a releasing position, shown by solid lines, in FIG. 2. As illustrated in FIG. 2, a lock-fixed limit 26 is also assigned to this end position of the adjusting lever 12 indicated by a broken line. This limit 26 is arranged at a distance from position 12*a* of the adjusting lever 12. The lock-fixed limit 26, because of its spaced arrangement, permits compensation of tolerances which may occur during the installation of the interior securing device 7. Simultaneously, the lock mechanism of the door lock 9 is designed such that, in each case, an actuating movement of the adjusting lever 12 also causes a corresponding releasing or securing operation of the door lock 9. The securing knob 11, due to possibly occurring tolerances, can have, in its released end position illustrated in FIG. 2, different heights relative to the interior panel part 14 and relative to the guide housing 13. However, these different heights of the securing knob 11** vary so slightly that they are almost visually imperceptible.

The foregoing disclosure has been set forth merely to illustrate the invention and is not intended to be limiting. Since modifications of the disclosed embodiment incorporating the spirit and substance of the invention may occur to persons skilled in the art, the invention should be construed to include everything within the scope of the appended claims and equivalents thereof.

What is claimed is:

1. An interior securing device by which a lock of a movable vehicle body part of a motor vehicle can be operated, the interior securing device comprising:

a securing knob which is arranged on a vehicle-interior side and which is guided so as to be moved linearly between a releasing position and a securing position so that an adjusting element of the lock can be moved between a release position and a locking position, a Bowden cable provided as a transmitting device by which the securing knob can be connected with the adjusting element to transmit tension and pressure loads, the securing knob being molded in one piece to a front end of the Bowden cable so that the Bowden cable is rigidly connected with the securing knob and can be linked to the adjusting element, a guide housing within which the securing knob is guided for linear reciprocal movement, and a flexible guiding sleeve surrounding the Bowden cable along its length so that the guiding sleeve is held, in an area of the securing knob, fixed by a detent connection to the guide housing and, in an area of the adjusting element, fixed to the lock.

2. The interior securing device according to claim 1, and further comprising an interior panel part fixed to said vehicle body part, a first stop defining an end position of the Bowden cable provided on said guide housing, and a second stop for an opposite end of the Bowden cable provided in an area of the adjusting element.

3. The interior securing device according to claim 2, wherein a compensating play within designated tolerances is assigned to the adjusting element for the end position defined by the first stop in the guide housing.

4. The interior securing device according to claim 2, wherein the guide housing is bush-shaped, wherein the detent connection fixes the guide housing in an opening of the interior panel part.

5. The interior securing device according to claim 1, wherein said vehicle body part is a side door.

6. A device by which a lock for a movable body part of a motor vehicle is selectively secured and released comprising:

a securing knob guided for movement within said vehicle so as to move an adjusting lever between lock secure and lock release positions in response to movement of said securing knob, a cable, to which said securing knob is rigidly secured, interconnecting the securing knob and the adjusting lever, a flexible guiding sleeve surrounding said cable, a first stop defining one end position of cable movement, a second stop defining an opposite end position of the cable movement, a guide housing by which at least one of said first and second stops is defined and within which the securing knob is guided for linear reciprocal movement, and a detent connection structure by which an end of the flexible guiding sleeve is fixed to the guide housing.

7. The device according to claim 6, wherein the guide housing is provided on an interior wall panel of the vehicle.

8. The device according to claim 7, wherein the first stop is defined by abutment between the securing knob and said guide housing.

9. The device according to claim 8, and further comprising a lock-side stop in said body part forming said second stop.

10. The device according to claim 9, wherein the flexible sleeve, within which said cable moves, is anchored to both the securing knob and the adjusting lever.

11. The device according to claim 7, wherein the flexible sleeve, within which said cable moves, is anchored to both the securing knob and the adjusting lever.

12. The device according to claim 7, wherein the flexible sleeve, within which said cable moves, is anchored to both the securing knob and the adjusting lever.

13. A device by which a lock for a movable body part of a motor vehicle is selectively secured and released comprising:

a securing knob guided for reciprocal movement within said vehicle so as to move an adjusting lever between lock secure and lock release positions in response to movement of said securing knob, a cable, to which said securing knob is rigidly secured, interconnecting the securing knob and the adjusting lever, a first stop defining one end position of cable movement, a second stop defining an opposite end position of the cable movement, a guide housing, within which the securing knob is guided for movement, provided on an interior wall panel of the vehicle, a flexible sleeve, within which said cable moves, anchored between the securing knob and the adjusting lever, and a detent connection structure by which an end of said flexible sleeve is fixed to said guide housing, wherein said detent connection structure includes detent hooks adapted to be received in detent recesses formed in said guide housing.

14. The device by which a lock for a movable body part of a motor vehicle is selectively secured and released comprising:

a securing knob guided for reciprocal movement within said vehicle so as to move an adjusting lever between lock secure and lock release positions in response to movement of said securing knob, a cable, to which said securing knob is rigidly secured, interconnecting the securing knob and the adjusting lever, a first stop defining one end position of cable movement, a second stop defining an opposite end position of the cable movement, a guide housing, within which the securing knob is guided for movement, provided on an interior wall panel of the vehicle, the first stop being defined by abutment between the securing knob and said guide housing, a lock-side stop in said body part forming said second stop, a flexible sleeve, within which said cable moves, anchored between the securing knob and the adjusting lever, and a structure by which an end of said flexible sleeve is fixed to said guide housing, wherein said structure includes detent hooks adapted to be received in detent recesses formed in said guide housing.

* * * * *